J. J. ROONEY.
DISH.
APPLICATION FILED JULY 16, 1915.
1,200,990.
Patented Oct. 10, 1916.
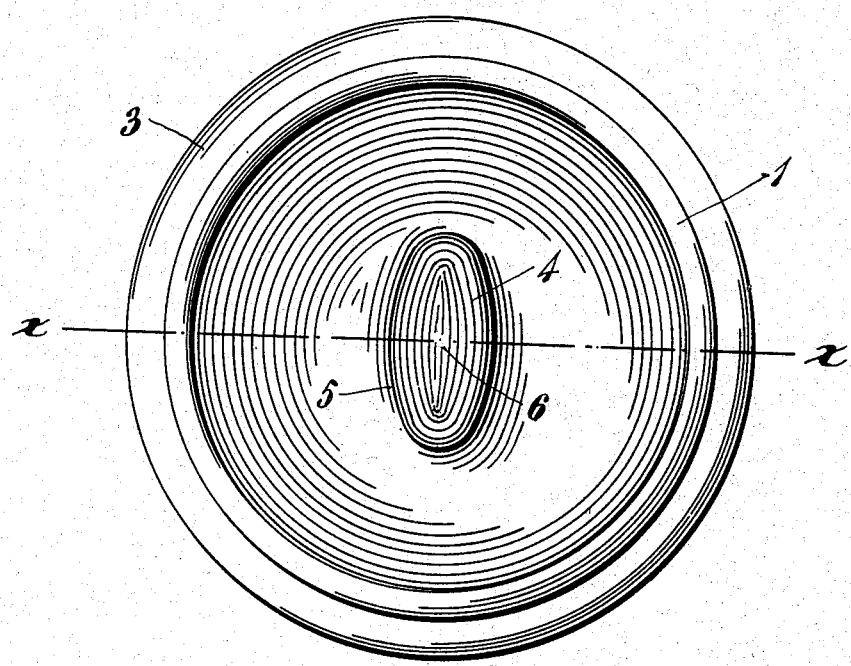
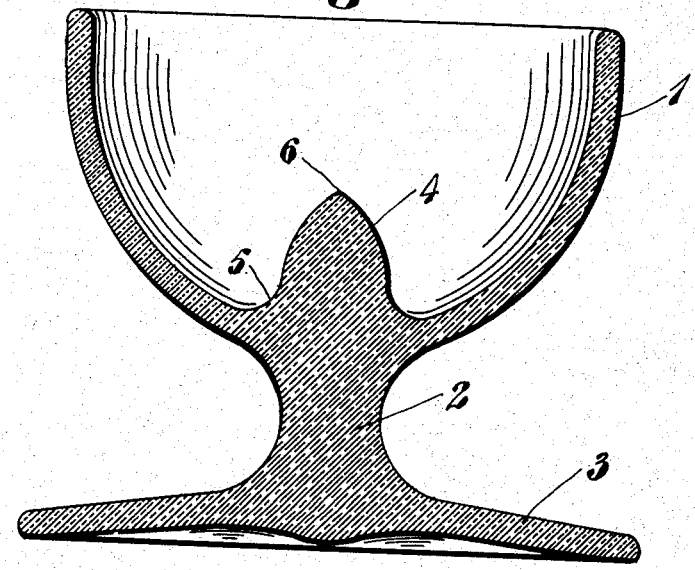

UNITED STATES PATENT OFFICE.

JOHN J. ROONEY, OF CINCINNATI, OHIO, ASSIGNOR OF ONE-HALF TO WILLIAM T. ROSSELL, JR., OF CINCINNATI, OHIO.

DISH.

1,200,990.  Specification of Letters Patent.  Patented Oct. 10, 1916.

Application filed July 16, 1915.  Serial No. 40,232.

*To all whom it may concern:*

Be it known that I, JOHN J. ROONEY, a citizen of the United States, and a resident of Cincinnati, in the county of Hamilton and State of Ohio, have invented certain new and useful Improvements in Dishes, of which the following is a specification.

My invention relates to dishes; and the object is to provide a dish for serving solid or semi-solid foodstuffs of inferior tenacity, such as ice cream and the like, in such a manner that partaking of the solid foodstuffs is facilitated, and if liquid foodstuff is present, this will not be spilled from the dish.

My invention consists in the combination of parts and in the details of construction and arrangement of parts as will herein be more fully described and claimed.

In the drawing: Figure 1 is a plan view of a dish embodying my invention; and Fig. 2 is a vertical cross section on the line $x$—$x$ of Fig. 1.

As my invention is exemplified herein, the dish comprises a substantially semi-spherical body or bowl 1 supported by a stem 2 on a base 3, being in these respects an ordinary well-known dish such as is used for serving ice cream and similar confections, more especially what are known as "sundaes". Some such dishes are made without stems, but provided with handles. Whatever the kind of dish in these respects, in the bottom of the bowl or body 1, preferably in the center, is the upward projection 4, designed to project into the body of solid or semi-solid foodstuff placed in the bowl or body 1, and prevent the mass of foodstuff from slipping or tilting in the bowl under the pressure of the spoon or other utensil used in partaking of the foodstuff as served in the dish. By thus preventing the sliding around or tilting of the mass of solid or semi-solid food stuff, partaking of the foodstuff is rendered less awkward, and there is obviated the inconvenience of forcing any liquid foodstuff over the rim of the body or bowl as is the case with ordinary dishes in serving ice cream, part of which may be melted, or which may be served with a juice or syrup. With the latter combination, generally known as a "sundae", it is especially difficult to avoid the spilling of the liquid juice or syrup, because the ice cream is generally placed in the dish in substantially a spherical form, and with the inside of the dish substantially semi-spherical and with the ice cream almost of a solid consistency, a pressure on the upper part of the mass, as with a spoon, in the attempt to cut off part of the mass will, unless it is very carefully applied in a direction substantially radially of the mass of ice cream, cause the spherical mass to turn or tilt very suddenly, making it difficult to partake of the foodstuff, and not only spilling the liquid contents of the dish, but splashing this liquid upon surrounding objects, including the apparel of the person who is eating the confection.

It is also desirable to prevent the mass of foodstuff from turning around in the dish on a substantially vertical axis. With this object in view, the projection 4 is somewhat elongated across the dish, as seen in Fig. 1. In order that the solid or semi-solid foodstuff may be readily forced down upon the projection 4 into its proper relative position in the bowl or body 1, the projection 4 is tapered from its base 5 in the bottom of the bowl or body 1 in all directions inward and upward to a point 6. In order that it may present no sharp edges or corners other than the point 6, and thereby not interfere with cleaning the dish, the projection 4 is preferably made elliptical at its base, as seen in Fig. 1, thereby fulfilling this latter requirement as well as having the elongated formation above mentioned. The base 5 of the projection 4 merges into the interior of the bottom of the body or bowl 1 in curves of ample radius, so that this part of the dish is as readily cleaned as any other part. The taper of the projection from the base 5 to the point 6 is preferably a convexly curved one, thereby reducing the acuteness of the point 6 without, however, destroying the penetrating properties. This formation also adds to the strength of the projection 4 itself. The projection 4 is preferably of a height somewhat less than half the depth of the interior of the bowl or body 1, so as to not objectionably reduce the capacity of the dish or render too difficult either the insertion of the foodstuff, or the removal thereof by the person to whom it is served.

The dish is generally made of glass, or may be made of any other earthenware, or of any other material, such as metal, if desired for any particular purpose. In any event, it is preferably made of one continuous piece of material as indicated in Fig. 1.

The projection, as shown and described above, is small enough to not seriously reduce the capacity of the dish, sufficiently acute to allow the foodstuff to be readily forced down over it, smooth enough to afford ample facility for cleaning the interior of the dish, and, at the same time, of sufficient bulk and transverse elongation not to tear through the body of foodstuff under the pressure on the foodstuff, and thus allow the body of foodstuff to turn around it or tilt in spite of the projection. Furthermore, the projection is so located in the dish and so limited in height relative to that of the quantity of foodstuff usually put into the dish that any given section of the ice cream or other semi-solid foodstuff of low tenacity on a side of the projection opposite to the direction in which a turning or tilting pressure is imposed shall be of ample dimension in its junction with the upper main part of the mass or body of foodstuff not to be sheared loose therefrom and thus permit the turning or tilting of the mass or body of foodstuff. In the present example, central location of the projection is best, but in some cases the above requirements may be met by different location or shape.

It will therefore be seen that my invention is capable of some modification, and therefore I do not wish to be understood as being limited to the example herein specifically shown and described, but

What I claim as new and desire to secure by Letters Patent is:

1. A dish comprising an interiorly substantially semi-spherical bowl or body with smooth inner sides, and a single directly upward projection on its bottom, lower than and confined away from the lateral inner sides of said bowl or body, said projection being smooth, but being elongated in cross-section at its base across said bottom and tapered from said base to an acute top, to admit a mass of solid or semi-solid dense foodstuff of low tenacity directly down over the projection and against said smooth inner sides, but to prevent such foodstuff from rotating around the smooth projection.

2. A dish comprising an interiorly substantially semi-spherical bowl or body with smooth inner sides, and a single directly upward projection on its bottom, lower than and confined away from the lateral inner sides of said bowl or body, said projection being smooth, but being elliptical in cross-section at its base, and tapered from said base to a pointed top, to admit a mass of solid or semi-solid dense foodstuff of low tenacity directly down over the projection and against said smooth inner sides, but to prevent such foodstuff from rotating around the smooth projection or from tilting laterally of the smooth interior of the dish.

JOHN J. ROONEY.

Witnesses:
WILLIAM T. ROSSELL, Jr.,
CLARENCE PERDEW.